United States Patent [19]

Wolfe et al.

[11] 4,112,328

[45] Sep. 5, 1978

[54] BARIUM MAGNESIUM FLUORIDE PHOSPHORS AND LAMPS AND X-RAY SCREENS EMBODYING SAME

[75] Inventors: Robert W. Wolfe, Wysox; Russell F. Messier, Pennsylvania Furnace, both of Pa.

[73] Assignee: GTE Sylvania Incorporated, Stamford, Conn.

[21] Appl. No.: 763,051

[22] Filed: Jan. 27, 1977

Related U.S. Application Data

[63] Continuation-in-part of Ser. No. 615,543, Sep. 22, 1975, abandoned.

[51] Int. Cl.[2] ............................................. C09K 11/46
[52] U.S. Cl. ............................ 313/486; 252/301.4 H; 250/483; 428/539
[58] Field of Search ................ 252/301.4 H, 301.4 R; 423/464; 428/539; 250/460, 483; 313/486

[56] References Cited

U.S. PATENT DOCUMENTS

| | | | |
|---|---|---|---|
| 3,448,056 | 6/1969 | Chenot | 252/301.4 H |
| 3,577,350 | 11/1972 | Amster | 252/301.4 H |
| 3,702,828 | 11/1972 | Hoffman | 252/301.4 H |

FOREIGN PATENT DOCUMENTS 118,929  3/1959  U.S.S.R.

OTHER PUBLICATIONS

Rolin et al., "Rev. Int. Hautes Temper. et Refruet.", 4, 1967, pp. 39–47.
Zakharov et al., "Chem. Abstracts", vol. 81, 1974, 83892p.
Nishioka et al., "Chem. Abstracts", 1935, 5728–5734.

*Primary Examiner*—Jack Cooper
*Attorney, Agent, or Firm*—John C. Fox

[57] ABSTRACT

Two new barium magnesium fluorides, $Ba_2Mg_3F_{10}$ and $BaMg_3F_8$, can be prepared by solid state reactions of barium fluoride and magnesium fluoride by heating in controlled atmospheric conditions at a temperature from about 700° C to about 850° C. In the $BaF_2$-$MgF_2$ binary system, compositions containing from about 40 to 85 mole percent of $MgF_2$ when activated by europium alone or in combination with manganese have been found to luminesce when excited by ultraviolet light, cathode rays, or with x-ray bombardment. Lamps incorporating these materials afford benefits of high temperature stability and x-ray intensifying screens incorporating these materials yield a speed equal to or better than present screens employing calcium tungstate.

9 Claims, 5 Drawing Figures

BARIUM MAGNESIUM FLUORIDE PHOSPHORS AND LAMPS AND X-RAY SCREENS EMBODYING SAME

CROSS-REFERENCE TO RELATED APPLICATIONS

This application is a continuation-in-part of Ser. No. 615,543, Filed: Sept. 22, 1975, now abandoned and incorporates by reference the disclosure set forth in that application which is assigned to the assignee of the present application.

BACKGROUND OF THE INVENTION

1. Field of the Invention

This invention relates to new compositions of matter in the barium fluoride-magnesium fluoride system. More particularly, it relates to barium-magnesium fluoride compositions and to the luminescent properties of the same and to devices utilizing the phosphors.

2. Prior Art

Rolin and Clausier in, Rev. Int. Haute Temper. et Refract., 4, 39 (1967), reported the existence of $BaMgF_4$ as the only compound in the system $BaF_2$-$MgF_2$. There has been no indication that the binary $BaF_2$-$MgF_2$ system can be activated to produce a luminescent composition. It is believed therefore that a new family of luminescent materials, which give certain luminescent properties, are believed to be an advancement in the art. Furthermore, two new compounds in the $BaF_2$-$MgF_2$ system, which can be utilized as hosts for certain luminescent materials, are also believed to be an advancement in the art.

OBJECTS AND SUMMARY OF THE INVENTION

It is an object of this invention to provide new compositions of matter.

It is a further object of this invention to provide a new family of luminescent materials.

It is an additional object of this invention to provide a process for producing ultraviolet sensitive materials and luminescent materials which can be activated by x-ray bombardment.

It is still an additional object of this invention to provide processes for producing the ultraviolet light excitable phosphor materials and for producing x-ray excitable phosphor materials.

It is still another object of this invention to provide an improved high pressure mercury vapor lamp which retains high efficiency of emission at elevated temperatures.

It is yet another object of this invention to provide an x-ray intensifying screen which utilizes the new compositions of matter as hosts and other phosphors of the barium fluoride-magnesium fluoride system.

These and additional objects of this invention are achieved in various aspects of the present invention. One aspect of this invention is the two new compositions of matter, $Ba_2Mg_3F_{10}$ and $BaMg_3F_8$.

An additional aspect of this invention, the materials of the $BaF_2$-$MgF_2$ system can be activated by europium alone or by europium and manganese to provide phosphors which are responsive to ultraviolet, cathode ray and x-ray excitation.

In another aspect of this invention the corresponding amounts of barium and magnesium fluoride are blended together with a suitable source of europium activator and heated under controlled atmospheric and temperature conditions to yield the particular type of luminescent material that is desired whether it is ultraviolet responsive, cathode ray responsive or x-ray responsive.

Still another aspect of this invention there is provided a high pressure mercury vapor lamp which retains its high efficiency of emission at elevated temperatures.

In still an additional aspect of this invention there is provided an x-ray intensifying screen which exceeds or is equal to the presently used calcium-tungstate screen having the beneficial properties associated with the calcium tungstate x-ray phosphor intensifying screen.

DETAILED DESCRIPTION OF THE PREFERRED EMBODIMENTS

Figure 1:
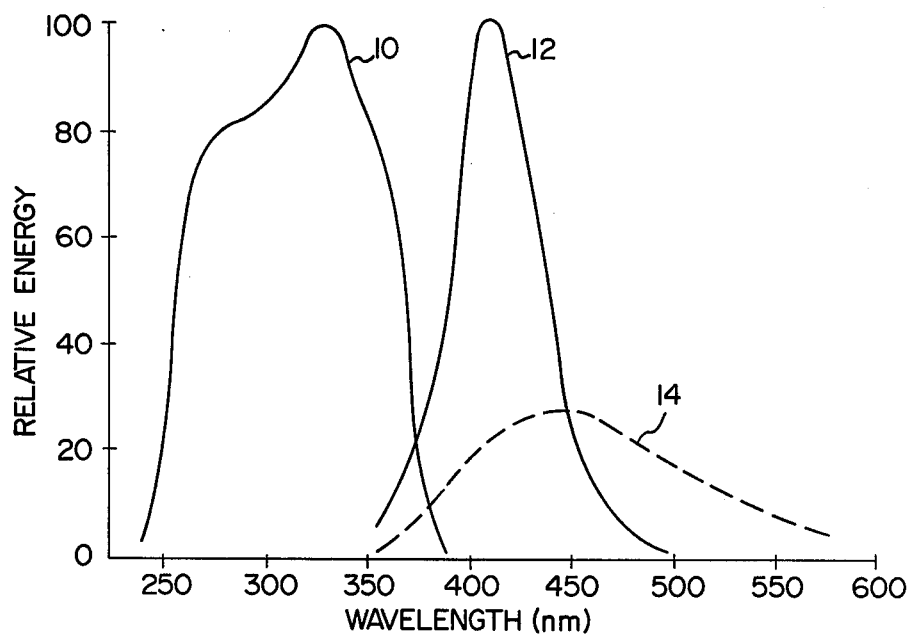
FIG. 1 shows the relative excitation spectrum and the relative spectral-energy distribution curve for one of the phosphors in this invention and the spectral-energy distribution for the well known lead activated calcium tungstate.

For a better understanding of the present invention, together with other and further objects, advantages, and capabilities thereof, reference is made to the following disclosure and appended claims in connection with the above-described drawings.

Two compounds have been discovered which can be represented by the formulas, $Ba_2Mg_3F_{10}$ and $BaMg_3F_8$.

The new composition of matter can be prepared by heating the appropriate amounts of $BaF_2$ and $MgF_2$ to a temperature of from about 700° C to about 850° C. For example, in the preparation of $Ba_2Mg_3F_{10}$, the molar ratio of barium fluoride to magnesium fluoride should be about 2:3 while a 1:3 barium fluoride to magnesium fluoride molar ratio is used to prepare $BaMg_3F_8$. Generally lower temperatures in the above range are preferred to produce the relatively pure barium-magnesium fluoride materials while higher temperatures in the above range are preferred if it is desired to incorporate an activator at the time of the synthesis of the mixed cation salt.

Thus, the process for producing a lamp phosphor comprises forming a relatively uniform admixture of a host-forming component of from about 40 to 85 mole percent of magnesium fluoride and from about 15 to about 60 mole percent of barium fluoride, and from about 0.01 to about 0.2 moles of europium fluoride per mole of the host-forming component, on a $BaF_2$ + $MgF_2$ basis, and from 0 to about 0.3 moles of manganese fluoride per mole of the host-forming component on a $BaF_2$ + $MgF_2$ basis, and heating the above admixture in a mildly reducing atmosphere such as an atmosphere containing from 85% to 95% nitrogen and from 5% to 10% by volume of hydrogen, for about 2 to about 4 hours at a temperature of from about 700° to about 850° C.

In the process for producing an x-ray phosphor a relatively uniform blend is formed which consists essentially of a host-forming component of from about 40 to 85 mole percent of magnesium fluoride and from about 15 to about 60 mole percent of barium fluoride, and from about 0.01 to about 0.2 moles of europium fluoride per mole of the host-forming component, on a $BaF_2$ + $MgF_2$ basis, and from 0 to about 0.3 moles of manganese fluoride per mole of the host-forming component on a $BaF_2$ + $MgF_2$ basis, and heating said blend in a non-reducing atmosphere preferably an inert atmosphere such as nitrogen, although an air atmosphere can be used, for about 2 to about 4 hours at a temperature of from about 700° to about 850° C.

While the amount of $MgF_2$ can vary in the host from about 40 to about 85 mole percent, the preferred level of $MgF_2$ is from about 50 to about 75 mole percent which encompasses the three compounds, $BaMgF_4$, $BaMg_3F_8$, and $Ba_2Mg_3F_{10}$, as well as mixtures of the above compounds.

As used herein the term "mildly reducing" encompasses atmospheres that have equal reducing capability as atmospheres containing from about 5 to about 15% by volume of hydrogen, balance a neutral atmosphere such as nitrogen. A neutral atmosphere is an inert gas such as nitrogen while a mild or slightly oxidizing atmosphere includes air and mixtures of oxygen and inert gases wherein the oxygen content is up to 25% by volume.

While the preferred utility is for luminescent materials these salts offer a water insoluble source of fluoride ions which are slightly soluble in acids thus have utility in other areas such as small amounts can be used for the prevention of cavities in human teeth. The x-ray diffraction pattern for $Ba_2Mg_3F_{10}$ and $BaMg_3F_8$ is shown in Table I along with the pattern for the previous known $BaMgF_4$.

$Ba_{1.94}Mg_3F_{10}$ : 0.06 $Eu^{+2}$, is presented by line 12. The emission spectrum, under the same excitation, of the National Bureau of Standards 1026 lead-activated calcium tungstate is represented by line 14. The barium-magnesium fluoride compound above along with other materials of the $BaF_2$-$MgF_2$ system can be efficiently activated with europium alone or in combination with manganese. The emission of all of the various barium-magnesium fluoride phosphors is quite similar when the same activators are used.

Figure 2:
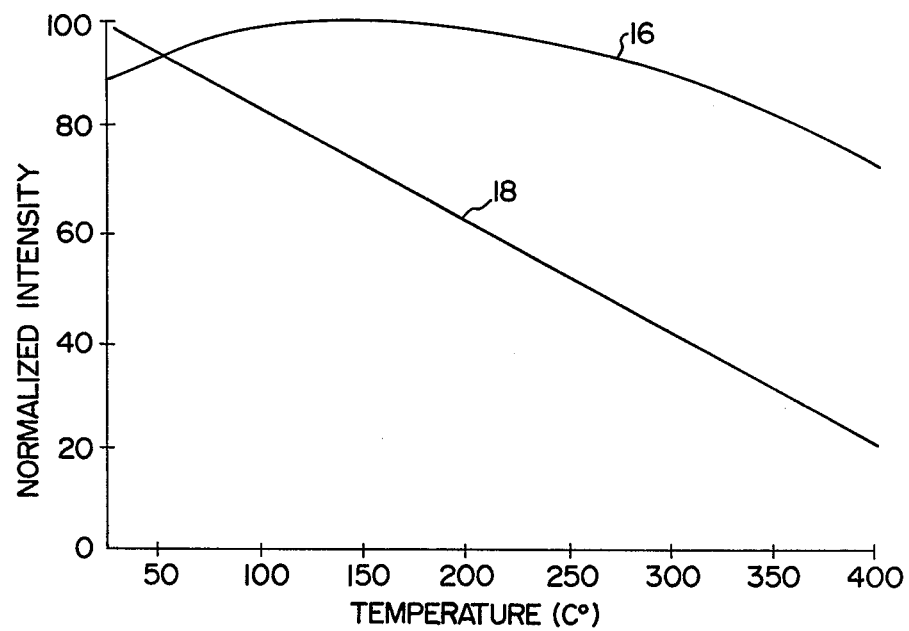
FIG. 2 shows the temperature dependence of emission for one of the phosphors of this invention as compared to zinc manganese-activated zinc silicate, one of the presently used phosphors.

The barium-magnesium fluoride phosphors of this invention also show remarkably good temperature dependence of emission. FIG. 2 shows emission intensity as a function of temperature for two phosphors. Line 16 is the material of this invention represented by formula, $Ba_{0.95}Mg_3F_8$:0.05 $Eu^{+2}$ and line 18 is the temperature dependence of the $Zn_2SiO_4$:Mn used in mercury vapor lamps. Maintenance of intensity at high temperatures is especially valuable for application in high pressure mercury vapor lamps where wall temperatures reach elevated temperatures.

Figure 3:
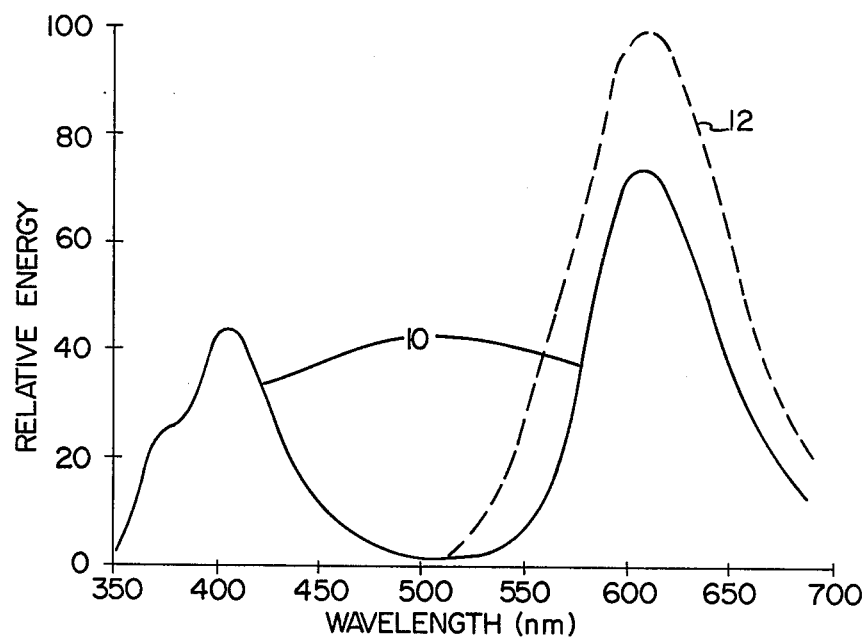
FIG. 3 shows the spectral-energy distribution curve for one of the phosphor materials of this invention containing the europium and manganese activator as compared to calcium silicate activated with lead and manganese, a phosphor of the prior art.

When the phosphors of this invention are activated with divalent manganese in combination with divalent europium, a double band phosphor results. In addition to the blue emission of divalent europium, a red band appears due to the emission of divalent manganese. The blue to red emission ratio can be varied by adjusting the Eu to Mn ratio. In FIG. 3, line 10 shows the emission spectrum of $BaMg_3F_8$ activated with 0.05 moles of europium fluoride and 0.2 moles of manganese fluoride. The red band emission due to Mn peaks at about 608 nm with half height band width of 80±5nm. FIG. 3, line 12 shows the emission spectrum of National Bureau of Standard No. 1029 calcium silicate; lead and manganese activated.

Both of the spectra in FIG. 3 were obtained by 254 nm excitation. The red band emission can be useful in lamps but serves no useful purpose in x-ray phosphors since the film used for x-rays is blue-sensitive and even

TABLE I

| Powder X-Ray Diffraction Data for Compounds in the $BaF_2$-$MgF_2$ System | | | | | | | | | | |
|---|---|---|---|---|---|---|---|---|---|---|
| $BaMgF_4$ Major Lines Index on Orthohombic Cell a = 14.6, b = 4.2 c = 5.8 A | | | $Ba_2Mg_3F_{10}$ | | | | $BaMg_3F_8$ | | | |
| d | Io | hkl | d | Io | d | Io | d | Io | d | Io |
| 7.5 | <5 | — | 8.63 | 10 | 2.76 | 5 | 6.92 | 5 | 2.93 | 17 |
| 7.3 | <5 | — | 5.64 | 12 | 2.56 | <5 | 6.51 | 15 | 2.84 | 25 |
| 4.55 | 85 | 201 | 4.73 | 14 | 2.51 | 5 | 5.61 | <5 | 2.81 | <5 |
| 3.98 | 10 | — | 4.54 | 24 | 2.48 | 15 | 4.75 | 13 | 2.71 | 5 |
| 3.63 | 60 | 400 | 4.12 | 20 | 2.41 | 15 | 4.72 | 34 | 2.62 | 6 |
| 3.52 | 5 | — | 4.10 | 20 | 2.37 | 12 | 4.59 | 7 | 2.47 | 8 |
| 3.28 | 100 | 111 | 3.92 | <5 | 2.34 | 5 | 4.37 | 15 | 2.41 | <5 |
| 3.14 | 50 | 310 | 3.75 | 5 | 2.33 | 20 | 4.11 | 5 | 2.37 | 5 |
| 3.08 | 50 | 401 | 3.63 | 9 | 2.30 | 60 | 3.76 | 28 | 2.35 | 30 |
| 2.91 | 30 | 002 | 3.56 | <5 | 2.26 | 15 | 3.58 | 25 | 2.33 | <5 |
| 2.76 | 10 | 311 | 3.49 | 7 | 2.24 | <5 | 3.44 | 24 | 2.30 | 45 |
| 2.42 | 10 | 600 | 3.27 | 25 | 2.20 | 10 | 3.40 | 11 | 2.26 | 20 |
| 2.37 | <5 | — | 3.23 | 100 | 2.14 | 65 | 3.27 | 40 | 2.23 | 35 |
| 2.34 | 40 | 112 | 3.18 | 60 | 2.06 | 7 | 3.24 | 70 | 2.16 | 7 |
| 2.27 | 30 | 402 | 3.14 | 10 | 2.04 | 15 | 3.19 | 35 | 2.14 | 25 |
| 2.24 | 10 | 601 | 3.08 | 50 | | | 3.15 | 30 | 2.11 | 20 |
| 2.20 | 70 | 511 | 3.03 | <5 | | | 3.07 | 20 | 2.07 | 15 |
| 2.13 | 80 | 312 | 2.97 | 20 | | | 3.05 | 10 | 2.05 | 12 |
| 2.06 | 40 | 020 | 2.90 | 5 | | | 3.03 | 20 | | |
| 1.877 | 15 | — | 2.84 | 5 | | | 2.98 | 5 | | |
| 1.855 | 15 | — | 2.81 | 5 | | | 2.95 | 12 | | |

FIG. 1, line 10, illustrates a typical excitation spectrum for the barium-magnesium fluorides compositions which are activated with europium. The emission spectrum of the phosphor, under 254 nanometer excitation, which phosphor is represented by the formula, though an oxidizing atmosphere can be used a major portion of the europium is in the divalent state as is evidenced by the emission.

The amount of europium fluoride as an activator can vary from about 0.01 moles to about 0.2 moles per mole of host and the amount of manganese fluoride can vary from 0 to about 0.3 moles per mole of host. The preferred levels of activators are from about 0.02 to about 0.15 moles of $EuF_2$ per mole of host and from 0 to about 0.25 moles $MnF_2$ per mole of host.

To more fully illustrate the invention the following detailed examples are presented. All parts, percentages and proportions are by weight unless otherwise indicated.

EXAMPLE I

About 1.94 moles of $BaF_2$ are blended together with about 3.0 moles of $MgF_2$ and about 0.06 moles of europium fluoride and are fired at 830° C in an atmosphere of 5% by volume of hydrogen and balance nitrogen for about 2 hours. The resulting material, $Ba_{1.94}Mg_3F_{10}$ : 0.06 $Eu^{+2}$ luminesces an intense deep blue as shown in FIG. 1. An x-ray diffraction pattern of this material corresponds essentially to that given in Table 1 for $Ba_2Mg_3F_{10}$. The chemical analysis of the host material also shows it to be represented by the formula, $Ba_2Mg_3F_{10}$.

EXAMPLE 2

About 1.0 mole of $BaF_2$ is blended together with about 3.0 moles of $MgF_2$, about 0.05 moles of europium fluoride and about 0.20 moles of $MnF_2$. The admixture is fired at about 830° C in an atmosphere similar to that in Example I for about 2 hours. The resulting material will luminesce in the blue and red, giving a bright orange visual emission. The emission spectrum corresponds to that given in FIG. 3 for $BaMg_3F_8$: 0.05 $EuF_2$, 0.20 $MnF_2$ and an x-ray diffraction pattern of this material corresponds essentially to that given in Table 1 for $BaMg_3F_8$. Chemical analysis of the host material shows that it can be represented by the formula, $BaMg_3F_8$.

EXAMPLE 3

About 0.95 mole of $BaF_2$, about 1 mole of $MgF_2$ and about 0.05 mole of europium fluoride are blended together and fired at about 830° C for about 2 hours in a neutral nitrogen or oxidizing air atmosphere. The resulting material responds to x-ray excitation with a deep blue emission similar to that given for $Ba_{1.94}Mg_3F_{10}$: 0.06 $Eu^{+2}$ in FIG. 1. An x-ray diffraction pattern of this material corresponds essentially to that given in Table 1 for $BaMgF_4$. The intensity of emission under x-ray excitation is equal to the well known $CaWO_4$ x-ray phosphor.

Figure 4:
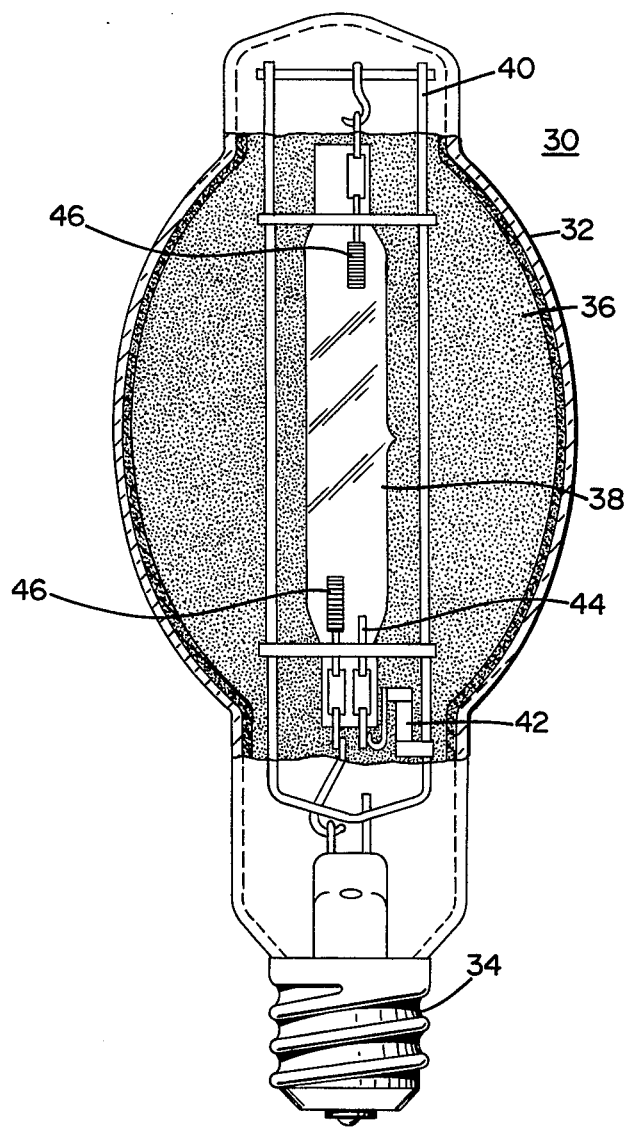
FIG. 4 is a cross-section of a typical high pressure mercury vapor lamp of this invention.

In FIG. 4 is shown a high-pressure, mercury vapor lamp 30 which comprises a radiation-transmitting outer envelope 32 having a conventional screw-type base 34 connected thereto. In accordance with the present invention, a composite phosphor is included as a layer 36 on the inner surface of the outer envelope 32 by means of a conventional supporting frame 40. A starting resistor 42 connects a starting electrode 44 to the energizing potential and, during operation, the mercury arc is sustained within the arc tube 38 between operating electrode 46.

Figure 5:
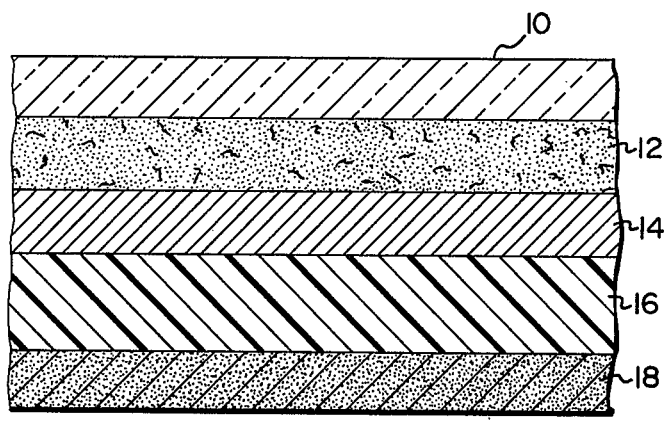
FIG. 5 is a cross-section of a typical x-ray intensifying screen of this invention.

With particular reference to FIG. 5, there is shown a cross-section of an x-ray intensifying screen of this invention. While the illustration of FIG. 5 shows an embodiment disclosed in U.S. Pat. No. 2,904,689, the present invention is not so limited. In more detail, the intensifying screen shown in FIG. 5 comprises five layers.

Layer 10 is a thin protective coating which is transparent to visible light such as a clear plastic. Layer 12 is a layer of the phosphor compositions of this invention. Layer 14 is an optional pigment light-reflecting layer such as titanium dioxide in a suitable binder. The layer can be used, if desired, to reflect light on the negative. Layer 16 is the base or support of the screen and is paper or plastic. If plastics are used their x-ray absorption should not be high. Suitable materials include cellulose acetate, polystyrene, polymethracylate, and the like. Layer 18 is also an optional layer and is aluminum or a resin containing aluminum particles. For proper function, layer 14 and layer 18 are not essential but can be used if desired.

While there has been shown and described what are at present considered the preferred embodiments of the invention, it will be obvious to those skilled in the art that various changes and modifications may be made therein without departing from the scope of the invention as defined by the appended claims.

What is claimed is:

1. A luminescent composition comprising a host selected from the group consisting of barium magnesium fluoride compounds and mixtures of barium fluoride and magnesium fluoride, wherein the $MgF_2$ content of said host is from about 40 to about 85 mole percent and the $BaF_2$ content is from about 15 to about 60 mole percent and, as an activator, from about 0.01 to about 0.2 moles $EuF_2$ per mole of host, and from 0 to about 0.3 moles $MnF_2$ per mole of host.

2. A composition according to claim 1 wherein said $MgF_2$ content is from about 50 to about 75 mole percent of the host.

3. A composition according to claim 1 wherein said $EuF_2$ content is from about 0.02 to about 0.15 moles of $EuF_2$ per mole of host.

4. A composition according to claim 1 wherein said $MnF_2$ content is from 0 to about 0.25 moles per mole of host.

5. An x-ray intensifying screen comprising:
   a. a base of a material transparent to x-rays,
   b. a coating on said base of a luminescent composition comprising a host selected from the group consisting of barium magnesium fluoride compounds and mixtures of barium fluoride and magnesium fluoride, wherein the $MgF_2$ content of said host is from about 40 to about 85 mole percent and the $BaF_2$ content is from about 15 to about 60 mole percent and, as an activator, from about 0.01 to about 0.2 moles $EuF_2$ per mole of host and
   c. a visible light transparent protective coating over said coating of luminescent material.

6. An x-ray screen according to claim 5 wherein said $MgF_2$ content is from about 50 to about 75 mole percent of the host.

7. A mercury discharge lamp comprising:
   a. an ultraviolet light transparent inner envelope,
   b. a fill of mercury inside said envelope,
   c. a pair of electrodes sealed at opposing ends of said envelope,
   d. an outer visible light transparent envelope encompassing said inner envelope, and
   e. a coating on the inner surface of said envelope of a luminescent composition comprising a host selected from the group consisting of barium magnesium fluoride compounds and mixtures of barium fluoride and magnesium fluoride, wherein the $MgF_2$ content of said host is from about 40 to about 85 mole percent and the BaF$_2$ content is from about 15 to about 60 mole percent and, as an activator, from about 0.01 to about 0.2 moles EuF$_2$ per mole of host, and from 0 to about 0.3 moles MnF$_2$ per mole of host.

8. A lamp according to claim 7 wherein said MgF$_2$ content is from about 50 to about 75 mole percent of the host.

9. A lamp according to claim 7 wherein said MnF$_2$ content is from 0 to about 0.25 moles MnF$_2$ per mole of host.

* * * * *